T. J. KEHOE.
AUTOMOBILE LOCK.
APPLICATION FILED AUG. 16, 1917.
1,397,524.
Patented Nov. 22, 1921.
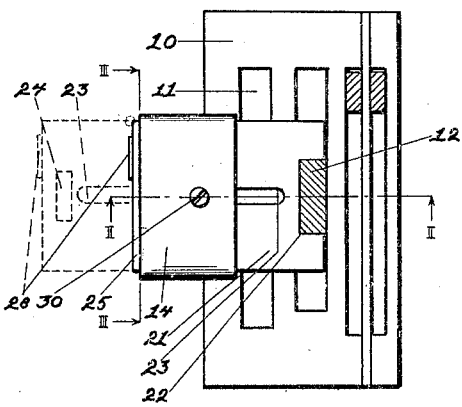
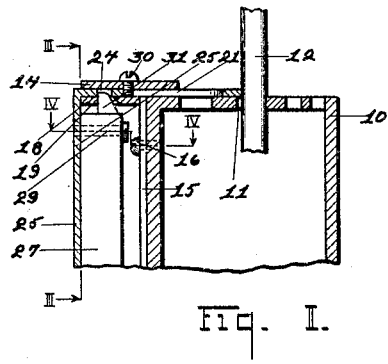
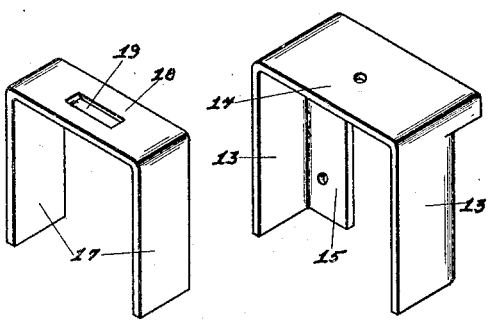
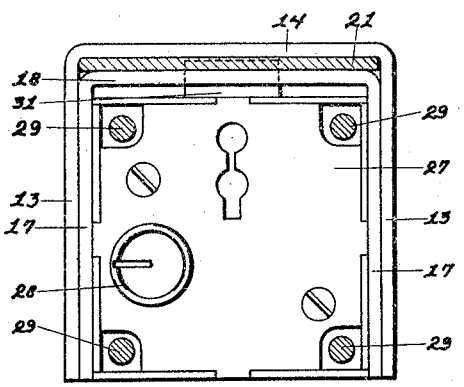
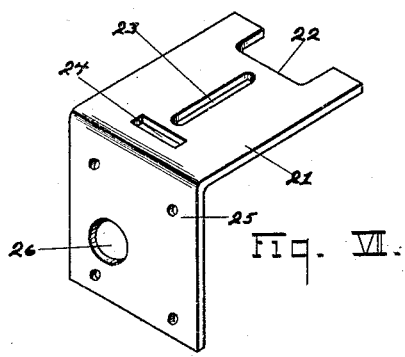
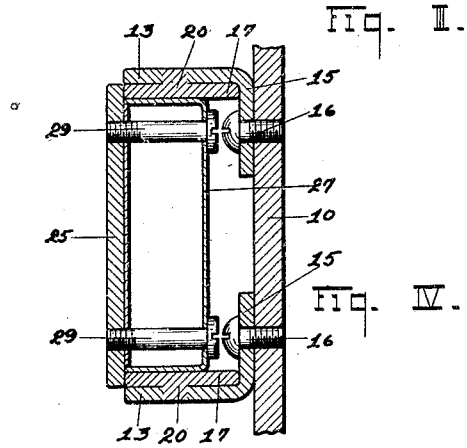
Inventor
Thomas J. Kehoe
By Chester H. Braselton
Attorney

UNITED STATES PATENT OFFICE.

THOMAS J. KEHOE, OF TOLEDO, OHIO, ASSIGNOR TO THE WILLYS-OVERLAND COMPANY, OF TOLEDO, OHIO, A CORPORATION OF OHIO.

AUTOMOBILE-LOCK.

1,397,524.  Specification of Letters Patent.  Patented Nov. 22, 1921.

Application filed August 16, 1917. Serial No. 186,488.

*To all whom it may concern:*

Be it known that I, THOMAS J. KEHOE, a citizen of the United States, residing at Toledo, in the county of Lucas and State of Ohio, have invented certain new and useful Improvements in Automobile-Locks, of which I declare the following to be a full, clear, and exact description.

This invention relates to improvements in automobile locks, and more particularly to improvements in locks of the type which operate with reference to the gear shifting segment so as to lock the gear shifting lever in neutral position.

The principal object of this invention is to provide a lock of this type which will be very simple and cheap in construction and readily accessible to the driver of the machine. A further object of this invention is to provide a lock of this type which is so constructed that the fastening and securing means will be concealed when the gear shift lever is locked, so that the lock cannot be taken apart to release the lever, and in which the securing and connecting means are readily accessible when the lock is unlocked so that it can be readily disconnected and taken to pieces if desired.

Further objects and objects relating to economies of manufacture and details of construction, will definitely appear from the detailed description to follow. I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Figure I is a top plan view of the gear shifting segment, the gear shifting lever being shown in section, showing my improved lock connected to the gear shifting segment.

Fig. II is a fragmentary, detail, sectional view, taken substantially on the line II—II of Fig. I.

Fig. III is a detail, sectional view taken substantially on the line III—III of Figs. I and II.

Fig. IV is a transverse, sectional view, taken substantially in the line IV—IV of Fig. II.

Fig. V is a detail, perspective view of the inner casing member.

Fig. VI is a detail, perspective view of the outer casing member, which is secured to the gear shifting segment, and Fig. VII is a detail, perspective view of the slidable plate adapted to engage and lock the gear shifting lever.

In the drawing similar reference numerals refer to similar parts throughout the several views and the sectional views are taken looking in the direction of the little arrows at the ends of the section lines.

Considering the numbered parts of the drawing, I have shown a gear shifting segment 10 provided with an H-slot 11 in which the gear shifting lever 12 works in the usual manner. The construction of this gear shifting segment with the H-slot and the gear shifting lever is well known in the art and needs no further description here as my invention is not concerned with its construction. A U-shaped outer casing member comprising vertical side members 13 and the horizontal cross member 14 is secured to the side of the gear shifting segment, the side members 13 being provided with inwardly turned flanges 15 which are secured to the side of the segment by the bolts 16 passing therethrough, the heads of said bolts being within the U-shaped casing member. The edge of the top member 14 projects laterally slightly over the side of the segment as shown in Fig. II of the drawing. An inner casing member is provided comprising the parallel side members 17 and the horizontal cross member 18, said U-shaped inner member being inclosed within the outer member just described and secured thereto by means of the spot welds 20, so that the horizontal member 18 of the inner casing is slightly spaced from the horizontal member 14 of the outer casing. Slot 19 is provided in the horizontal portion 18 of said inner casing member. Plate 21 is slidably mounted in said casing between the members 18 and 14, as clearly appears from Figs. II and III of the drawing, said plate being provided at its forward end with a notch 22 which is adapted to engage the gear shifting lever. Said plate is also provided with a longitudinally extending slot 23 and with a transversely extending slot 24, which is adapted to register with the slot 19 in member 18. The plate 21 is provided with a downwardly extending flange 25 having an opening 26 therein. A lock 27 having a key cylinder 28 and a bolt 31 is secured to the inner side of flange 25 by means of the bolts 29, with the end of the key cylinder 28 extending through the opening 26 in said flange, and the bolt 31 so disposed as to project through the slot 24 in the plate 21. A screw 30 passing through the upper horizontal member 14 of the outer casing projects into the longitudinally extending slot 23 so as to limit the movement of said plate 21 relative to the casing.

From the description of the parts given above, the operation of my device should be very readily understood. In Fig. I, the lock is shown in position to lock the gear shift lever in neutral. In order to release the lever, the key is inserted in the cylinder 28, which projects through the opening 26 of the flange 25, and the rotation of the key withdraws the bolt 31 from the opening 19 in the cross member 18 of the casing. The plate 21 which carries the lock 27 can then be moved transversely of the gear shifting segment, withdrawing the end thereof with the lotch 22 from engagement with the gear shifting lever so that the lever can be freely moved in the H-slot.

It will be seen that, when the lock is unlocked, by removing the screw 30 the plate 21 and the lock carried thereby can be removed from the casing made up of the two U-shaped members and which is secured to the side of the segment. When the plate 21 and the lock carried thereby is removed, the lock can be removed from its connection with the flange 25 by removing the screws 29, and hence the lock can be changed or the interior of the lock uncovered so as to repair the lock. When the lock is in operative position locking the gear shifting lever, the heads of the screws 29 are disposed within the casing member which is secured to the gear shift segment by the screws 16, and the heads of both screws 16 and screws 29 are disposed within such casing so that they are entirely inaccessible as long as the lock is in locked position. The removal of the screw 30 would not permit of the removal of the lock because the bolt is still in engagement with the slots 19 and 24 so as to prevent movement of the plate and the lock carried thereby relative to the casing. This lock is very simple in construction and can be manufactured at a low cost and at the same time it affords a very simple and accessible construction and one which can be readily operated to lock the gear shift lever in neutral against unauthorized movement.

I am aware that the particular embodiment of my invention, which I have here shown and described, is susceptible of considerable variation without departing from the spirit of my invention. I have found, however, that this particular embodiment is desirable from many standpoints, and, therefore, I desire to claim the same specifically as well as broadly, as indicated by the appended claims.

Having thus described my invention, what I claim as new and desire to secure by Letters Patent, is:

1. A device of the class described comprising the combination of a casing adapted to be secured to the side of a gear shifting segment; guides upon said casing, a plate slidably mounted between said guides and movable transversely across the top of said segment, said plate being provided with a notch in the end thereof adapted to engage the gear shifting lever; and a lock carried by said plate and operable to lock said plate relative to said casing.

2. A device of the class described comprising the combination of a casing adapted to be secured to the side of a gear shifting segment, said casing comprising a pair of U-shaped members telescoped one within the other and secured together, the tops of said U-shaped members being slightly spaced apart; a plate carried by said casing and slidably disposed between the tops of said U-shaped members so as to be movable transversely across the top of said segment, said plate being provided with a notch in the end thereof adapted to engage a gear shifting lever; and a lock carried by said plate and operable to lock said plate relative to said casing.

3. A device of the class described comprising the combination of a U-shaped member adapted to be secured to the side of a gear shifting segment; a second U-shaped member telescoped within said first U-shaped member and having the legs thereof secured to the legs of said first U-shaped member, the top portions of said members being spaced apart and one of them being provided with a transverse slot therein; a plate slidably mounted between the top portions of said U-shaped members, and having a notch in the end thereof adapted to engage a gear shifting lever, said plate being provided with a transverse slot adapted to aline with the transverse slot in said U-shaped member; and a lock carried by said plate and having a bolt adapted to pass through said alined slots to lock the plate relative to said U-shaped members.

4. A device of the class described the combination of a casing adapted to be secured to a gear shifting segment and provided with a pair of parallel spaced top walls; a plate having a downwardly extending portion adapted to close the front of said casing, said plate being slidably mounted between said parallel top walls; and a lock carried by said plate and adapted to lock the same relative to said casing.

5. A device of the class described comprising the combination of a casing adapted to be secured to the side of a gear shifting segment and provided with a pair of spaced walls; a plate slidably mounted between said walls and adapted to engage a gear shifting lever to lock the same; means for limiting the movement of said plate relative to said casing; and a lock carried by said plate and having a bolt operable to lock said plate relative to said casing.

6. A device of the class described comprising the combination of a casing adapted to be secured to the side of a gear shifting segment and provided with a pair of parallel top walls, one of said top walls having a slot therein; a plate slidable between said top walls and adapted to engage the gear shifting lever to lock the same; means for limiting the movement of said plate relative to said casing; said plate being provided with a slot adapted to aline with the slot in said top wall; and a lock carried by said plate and having a bolt operable through said alined slots to lock the plate with reference to said casing.

7. A device of the class described comprising the combination of a casing adapted to be secured to the side of a gear shifting segment, and provided with a pair of parallel top walls; screws securing said casing to said segment, the heads of said screws being disposed within said casing; a plate slidably mounted between said top walls and adapted to engage a gear shifting lever to lock the same; a lock carried by said plate and adapted to lock said plate relative to said casing; and screws securing said lock to said plate, the heads of said screws being disposed within said casing whereby they are inaccessible when said plate is locked relative to said casing.

8. A device of the class described comprising the combination of a gear shifting segment; a lever operable therein; a casing provided with a pair of inwardly turned flanges, and a pair of parallel spaced top walls; means securing said flanges to said segment; a plate slidable between said top walls to engage the lever to lock the same; and a lock carried by said plate and having a bolt operable through alined slots in one of said top walls and said plate to lock said lever relative to said segment.

9. A device of the class described comprising the combination of a gear shifting segment; a gear shifting lever; a plate slidable transversely across the top of said segment and adapted to engage the lever to lock the same in neutral; parallel guides between which said plate is adapted to move and means carried by said plate for locking the same against movement relative to said segment.

10. The combination with a gear shifting segment having a slotted guide for a control lever, of a casing fixed upon the segment and having parallel guide members and a plate adapted to be guided thereby across the top of the segment in a path extending at a right angle to the slot and into engagement with the lever, and a lock carried by the plate and movable with the plate for locking said plate when moved to said position.

In testimony whereof I affix my signature.

THOMAS J. KEHOE.